US008606613B2

United States Patent
Hegmann et al.

(10) Patent No.: US 8,606,613 B2
(45) Date of Patent: Dec. 10, 2013

(54) METHOD, SYSTEM AND PROGRAM PRODUCT FOR FUNDING AN OUTSOURCING PROJECT

(75) Inventors: Katherine C. Hegmann, Fredericksburg, VA (US); Steven M. Kagan, Burr Ridge, IL (US); John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 2301 days.

(21) Appl. No.: 10/964,529

(22) Filed: Oct. 12, 2004

(65) Prior Publication Data

US 2006/0080119 A1 Apr. 13, 2006

(51) Int. Cl.
*G06Q 10/00* (2012.01)
*G06Q 40/00* (2012.01)

(52) U.S. Cl.
USPC ........... 705/7.22; 705/7.13; 705/7.23; 705/35

(58) Field of Classification Search
None
See application file for complete search history.

(56) References Cited

U.S. PATENT DOCUMENTS

| | | | | |
|---|---|---|---|---|
| 6,301,574 B1 * | 10/2001 | Thomas et al. | | 705/26.3 |
| 6,738,736 B1 * | 5/2004 | Bond | | 703/2 |
| 6,895,382 B1 * | 5/2005 | Srinivasan et al. | | 705/7 |
| 7,051,199 B1 * | 5/2006 | Berson et al. | | 713/150 |
| 7,092,929 B1 * | 8/2006 | Dvorak et al. | | 705/28 |
| 7,249,030 B2 * | 7/2007 | Sopko et al. | | 705/305 |
| 7,269,569 B2 * | 9/2007 | Spira et al. | | 705/7.36 |
| 7,437,304 B2 * | 10/2008 | Barnard et al. | | 705/7.15 |
| 7,548,871 B2 * | 6/2009 | Ricketts | | 705/7.12 |
| 7,813,993 B1 * | 10/2010 | Barto et al. | | 705/37 |
| 2001/0051913 A1 * | 12/2001 | Vashistha et al. | | 705/37 |
| 2002/0052775 A1 * | 5/2002 | Fisher et al. | | 705/10 |
| 2002/0077877 A1 * | 6/2002 | Oliver | | 705/8 |
| 2002/0087336 A1 | 7/2002 | Hale et al. | | |
| 2002/0103731 A1 * | 8/2002 | Barnard et al. | | 705/34 |
| 2003/0046195 A1 * | 3/2003 | Mao | | 705/30 |
| 2003/0097319 A1 | 5/2003 | Moldovan et al. | | |
| 2003/0135399 A1 * | 7/2003 | Ahamparam et al. | | 705/7 |
| 2003/0172145 A1 * | 9/2003 | Nguyen | | 709/223 |
| 2003/0191674 A1 | 10/2003 | Hale et al. | | |
| 2003/0200168 A1 * | 10/2003 | Cullen et al. | | 705/37 |
| 2003/0216926 A1 * | 11/2003 | Scotto et al. | | 705/1 |
| 2004/0030992 A1 * | 2/2004 | Moisa et al. | | 715/513 |
| 2004/0039681 A1 * | 2/2004 | Cullen et al. | | 705/37 |
| 2004/0103002 A1 * | 5/2004 | Colley et al. | | 705/2 |

(Continued)

OTHER PUBLICATIONS

Greaver, Maurice F., "Strategic Outsourcing", Feb. 1999, American Management Association, pp. 18-19.*

(Continued)

*Primary Examiner* — Gregory Johnson
(74) *Attorney, Agent, or Firm* — Matthew Chung; Hoffman Warnick LLC (57) ABSTRACT

Under the present invention when a business process is desired to be outsourced from a client (e.g., a company or governmental unit) to a third party outsourcer, an outsourcing project is initially planned. Typically, the plan includes a plurality of overlapping phases that extend over several time periods. Thereafter, a cost for implementing the outsourcing project is estimated. Should the cost exceed a planned budget of the client, the excess/investment is addressed while an agreement between the client and the outsourcer for the outsourcing project is being reached. This can involve reducing scope, restructuring the overlapping phases to reduce or eliminate the excess cost, and/or integrating funding options to address the cost as part of the agreement.

18 Claims, 5 Drawing Sheets

(56) References Cited

U.S. PATENT DOCUMENTS

| | | | |
|---|---|---|---|
| 2004/0225549 A1* | 11/2004 | Parker et al. | 705/8 |
| 2005/0010477 A1* | 1/2005 | Sullivan et al. | 705/14 |
| 2005/0027696 A1* | 2/2005 | Swaminathan et al. | 707/3 |
| 2005/0043976 A1* | 2/2005 | Leehman | 705/7 |
| 2005/0049911 A1* | 3/2005 | Engelking et al. | 705/11 |
| 2005/0114829 A1* | 5/2005 | Robin et al. | 717/101 |
| 2005/0144125 A1* | 6/2005 | Erbey et al. | 705/40 |
| 2005/0278202 A1* | 12/2005 | Broomhall et al. | 705/7 |
| 2005/0288984 A1* | 12/2005 | Hamilton | 705/8 |
| 2006/0004596 A1* | 1/2006 | Caniglia et al. | 705/1 |
| 2006/0059032 A1* | 3/2006 | Wong et al. | 705/10 |
| 2006/0064315 A1* | 3/2006 | Koch et al. | 705/1 |
| 2006/0080119 A1* | 4/2006 | Hegmann et al. | 705/1 |
| 2007/0208604 A1* | 9/2007 | Purohit et al. | 705/9 |

OTHER PUBLICATIONS

Natasha Gray, "Funding an Outsourcing Engagement with Entrepreneurs' Equity", OutsourcingCenter, Nov. 2002, www.outsourcing-information-technology.com/funding.html, pp. 1-4.

Jeff Smith, "IT Outsourcing's Bottom Line", RISNews, Accenture, 1996-2004, pp. 1-2.

Peter Dixon, "Transformational Outsourcing", Dimension Data South Africa, Oct. 2003, pp. 1-5.

* cited by examiner

METHOD, SYSTEM AND PROGRAM PRODUCT FOR FUNDING AN OUTSOURCING PROJECT

BACKGROUND OF THE INVENTION

1. Field of the Invention

In general, the present invention provides a method, system and program product for determining funding options for an outsourcing project. Specifically, the present invention addresses funding for any incremental investments required by a client for outsourcing one or more business processes.

2. Related Art

In business it is becoming increasingly common for organizations to outsource various business processes to third party outsourcers. Some business processes that are now regularly outsourced include contact centers, accounting operations, human resources services, procurement, etc. This recent trend of outsourcing business processes has been largely caused by the ever increasing requirements in terms of infrastructure and resources to perform such business processes. To this extent, three types of outsourcing commonly practiced are Business Process Outsourcing (BPO), Business Transformation Outsourcing (BTO), and Information Technology Outsourcing (ITO).

Under BPO, an outsourcer assumes responsibility for performing one or more business processes that were previously done by the client or another outsourcer. Business processes targeted for this form of outsourcing are seldom core business processes of the client. For instance, accounting and human resources are not core business processes unless the client generates its revenue primarily through its accounting or human resources services. When outsourced, the business processes are typically changed only slightly, if at all, but lower labor rates generally enable an overall reduction in the cost of performing the business processes. Information technology (IT) may or may not play a significant role in reducing the cost of the outsourced business processes.

Under BTO, business processes are also assumed by an outsourcer, but the business processes themselves may be substantially changed—often through IT and business process redesign (as will be further described below). Furthermore, the business processes being outsourced may be core or non-core process. For instance, to a web-based retailer, shipping is a core business process that is usually outsourced because the outsourcers have more advanced technology and much larger scale. Likewise, to a telemarketer, its Customer Relationship Management (CRM) is a core business process that may be amenable to transformational outsourcing. In such cases, the business transformation goes beyond just cost reduction. The outsourcer may be able to provide substantially higher service levels, such as fewer lost calls, shorter hold times, faster handle times, and higher problem resolution rates. A transformational outsourcer may also be able to drive a change in the client's business strategy, for example, by serving global rather than just national markets. Furthermore, the outsourcer may be able to enhance the client's financial condition, for example, by acquiring some of the client's assets and hiring employees that it no longer needs to perform the processes.

As mentioned above, BTO deals virtually always include elements of ITO, which itself typically includes the data center, desktop computing, networking, and application management. Like BTO, ITO deals are often large, extremely complex transactions. Moreover, BTO thus may involve thousands of employees and business partners at hundreds of sites around the world. Likewise, hundreds of millions of dollars worth of assets may be involved. Even if the outsourcing transaction is smaller financially and limited to one country, other dimensions of the transaction, such as computers, software applications, and communication networks, may be quite complex. Moreover, if an objective of outsourcing is to move from a lagging to industry-leading business processes, the amount of change required can be large—including office redesign, replacement of equipment, and retraining of staff in the new business processes. Therefore, the necessary investment for a successful transition to outsourced business processes can appear large, especially if the client's business is under stress.

Although the ultimate business benefits of an outsourcing agreement are often readily evident over time in the form of reduced cost, increased revenue, and increased customer/employee satisfaction, the client investment in the transition project itself can be a substantial barrier to attaining those benefits. Particularly, when the primary motivation for outsourcing is cost reduction, the client's business may be unable to justify the investment—or even qualify for financing—thereby remaining locked in an uncompetitive and declining position. This is especially the case when the cost of outsourcing business processes exceeds the current cost for performing those business processes at the client.

Known solutions to this problem are for the client to (a) fund the project with a budget from within, (b) obtain financing via a third party loan, or (c) if the client firm has a separate financing division, obtain financing from such an internal source. However, none of these existing solutions directly involve the outsourcer, and therefore seldom are integrated into the business case or the terms of the subsequent BPO/BTO agreement. From the client's point of view, this can be a disadvantage because the outsourcer has (a) little or no ability to help the client obtain favorable financing terms and (b) minimal incentive to plan and perform the project in a manner that leverages the funding.

In view of the foregoing, there exists a need for a method, system and program product for determining funding options for an outsourcing project. Specifically, a need exists whereby any costs involved with outsourcing business processes can be addressed as part of the outsourcing agreement process.

SUMMARY OF THE INVENTION

In general, the present invention provides a method, system and program product for determining funding options for an outsourcing project. Specifically, under the present invention when a business process is desired to be outsourced from a client (e.g., a company or governmental unit) to a third party outsourcer, an outsourcing project is initially planned. Typically, the plan includes a plurality of overlapping phases that extend over several time periods. Thereafter, a cost for implementing the outsourcing project is estimated. Should the cost exceed a planned budget of the client, the excess/investment is addressed while an agreement between the client and the outsourcer for the outsourcing project is being reached. This can involve reducing scope, restructuring the overlapping phases to reduce or eliminate the excess cost, and/or integrating funding options to address the cost as part of the agreement.

A first aspect of the present invention provides a method for determining funding options for an outsourcing project corresponding to one or more business processes to be outsourced from a client to an outsourcer, comprising: planning the outsourcing project, wherein the outsourcing project is planned to have a plurality of overlapping phases extending over a plurality of time periods; estimating a cost to the client for implementing the outsourcing project; restructuring the plurality of overlapping phases to prevent the cost from exceeding a planned budget of the client; and presenting the outsourcing project after the restructuring.

A second aspect of the present invention provides a method for determining funding options for an outsourcing project corresponding to one or more business processes to be outsourced from a client to an outsourcer, comprising: planning the outsourcing project; estimating a cost for implementing the outsourcing project as planned, and an excess of the cost above a planned budget of the client; and addressing funding to cover the excess while an agreement for the outsourcing project is being reached between the outsourcer and the client.

A third aspect of the present invention provides a system for determining funding options for an outsourcing project corresponding to one or more business processes to be outsourced from a client to an outsourcer, comprising: a planning system for planning the outsourcing project, wherein the outsourcing project is planned to have a plurality of overlapping phases extending over a plurality of time periods; a cost calculation system for estimating a cost to the client for implementing the outsourcing project as planned, and for estimating an excess of the cost beyond a planned budget of the client; and a funding system for providing funding options to cover the excess while an agreement for the outsourcing project between the client and the outsourcer is being reached.

A fourth aspect of the present invention provides a program product stored on a recordable medium for determining funding options for an outsourcing project corresponding to one or more business processes to be outsourced from a client to an outsourcer, which when executed, comprises: program code for planning the outsourcing project, wherein the outsourcing project is planned to have a plurality of overlapping phases extending over a plurality of time periods; program code for estimating a cost to the client for implementing the outsourcing project as planned, and for estimating an excess of the cost beyond a planned budget of the client; and program code for providing funding options to cover the excess while an agreement for the outsourcing project between the client and the outsourcer is being reached.

A fifth aspect of the present invention provides a method for deploying an application for determining funding options for an outsourcing project corresponding to one or more business processes to be outsourced from a client to an outsourcer, comprising: providing a computer infrastructure being operable to: plan the outsourcing project, wherein the outsourcing project is planned to have a plurality of overlapping phases extending over a plurality of time periods; estimate a cost to the client for implementing the outsourcing project as planned, and estimate an excess of the cost beyond a planned budget of the client; and provide funding options to cover the excess while an agreement for the outsourcing project between the client and the outsourcer is being reached.

A sixth aspect of the present invention provides computer software embodied in a propagated signal for determining funding options for an outsourcing project corresponding to one or more business processes to be outsourced from a client to an outsourcer, the computer software comprising instruction to cause a computer system to perform the following functions: plan the outsourcing project, wherein the outsourcing project is planned to have a plurality of overlapping phases extending over a plurality of time periods; estimate a cost to the client for implementing the outsourcing project as planned, and estimate an excess of the cost beyond a planned budget of the client; and provide funding options to cover the excess while an agreement for the outsourcing project between the client and the outsourcer is being reached.

Therefore, the present invention provides a computer-implemented method, system and program product for determining funding options for an outsourcing project.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for determining funding options for an outsourcing project. Specifically, under the present invention when a business process is desired to be outsourced from a client (e.g., a company or governmental unit) to a third party outsourcer, an outsourcing project is initially planned. Typically, the plan includes a plurality of overlapping phases that extend over several time periods. Thereafter, a cost for implementing the outsourcing project is estimated. Should the cost exceed a planned budget of the client, the excess/investment is addressed while an agreement between the client and the outsourcer for the outsourcing project is being reached. This can involve reducing scope, restructuring the overlapping phases to reduce or eliminate the excess cost, and/or integrating funding options to address the cost as part of the agreement.

Figure 1:
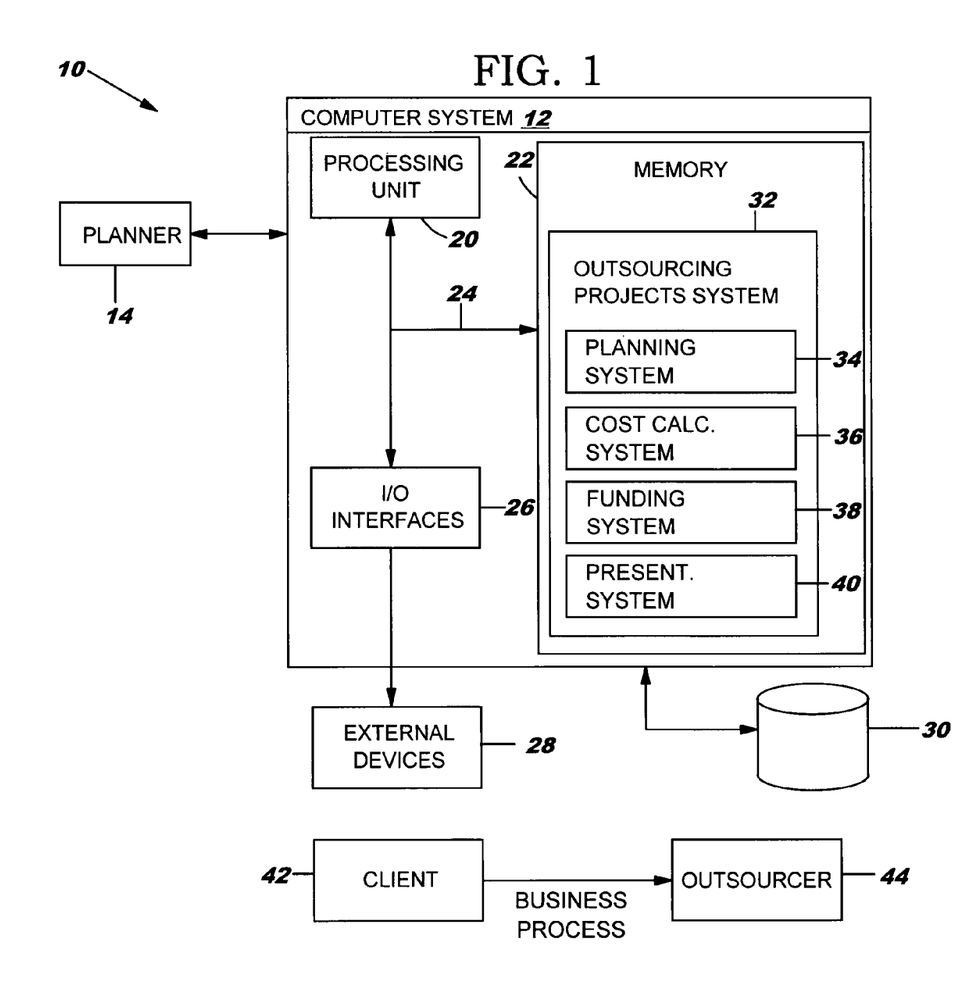
FIG. 1 depicts a system for determining funding options for an outsourcing project according to the present invention.

Referring now to FIG. 1, a system 10 for determining funding options for an outsourcing project according to the present invention is shown. As will be further described below, an "outsourcing project" typically pertains to a business function that is being outsourced from a client 42 (e.g., a company or governmental unit) to an outsourcer 44. Examples of business functions include contact centers, accounting operations, human resources services, procurement, etc. Moreover, the term "outsourcing project" under the present invention is intended to mean be any type of outsourcing project such as a Business Process Outsourcing (BPO) project, a Business Transformation Outsourcing (BTO) project, an Information Technology Outsourcing (ITO) project, etc. The term "client" is intended to mean any entity (e.g., individual, company, organization, etc.) that is outsourcing one or more business processes to a third party. The term "outsourcer" is intended to mean any entity that is performing business processes on behalf of a client. Moreover, the "client's planned budget" can be equal to a current cost of performing the business process at the client, it can be lower if cost takeout is the client's priority, or it can be higher if strategic change is the client's priority.

In general, system 10 includes a computer system 12 having a computer-implemented tool/software program (outsourcing project system 32). To plan and fund an outsourcing project, planner 14 will input first define a plan for the project by setting forth the parameters (e.g., phases, time periods, costs, etc.) thereof. Based on the inputted plan, a cost of the outsourcing project can be estimated. Should the cost exceed the client's planned budget 42, planner 14 can plan for the excess. To this extent, planner 14 can be a representative of an entity seeking to outsource a business process (i.e., the client 42), or planner 14 can be a representative of a third party company (e.g., an outsourcer/service provider 44) that will perform the business process on behalf of a client 42.

Computer system 12 is intended to represent any type of computerized device capable of carrying out the teachings of the present invention. For example, computer system 12 could be a desktop computer, a laptop computer, a hand held device, a workstation, a server, a client, etc. To this extent, it should also be appreciated that computer system 12 could be a stand-alone computer system as shown, or it could be implemented over a network such as the Internet, a local area network (LAN), a wide area network (WAN), a virtual private network (VPN), a personal area network (PAN), etc. In the case of the latter, planner 14 could utilize a separate computerized device (e.g., a client) to interface with computer system 12 over the network. Moreover, communication through the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

In any event, computer system 12 generally includes processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., a database, etc.) capable of providing storage for information under the present invention. Such information could include, among other things, outsourcing project plans, cost calculations, funding options, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 is outsourcing project system 32 (hereinafter project system 32). As indicated above, project system 32 is a computer-implemented tool with which planner 14 will interface to plan an outsourcing project, and address funding therefor. As shown, project system 32 includes planning system 34, cost calculation system 36, funding system 38 and presentation system 40. Each of these systems will be further described below, however, it should be understood that these systems typically provide planner 14 with any necessary interface pages for inputting and/or changing values or plans.

Figure 2:
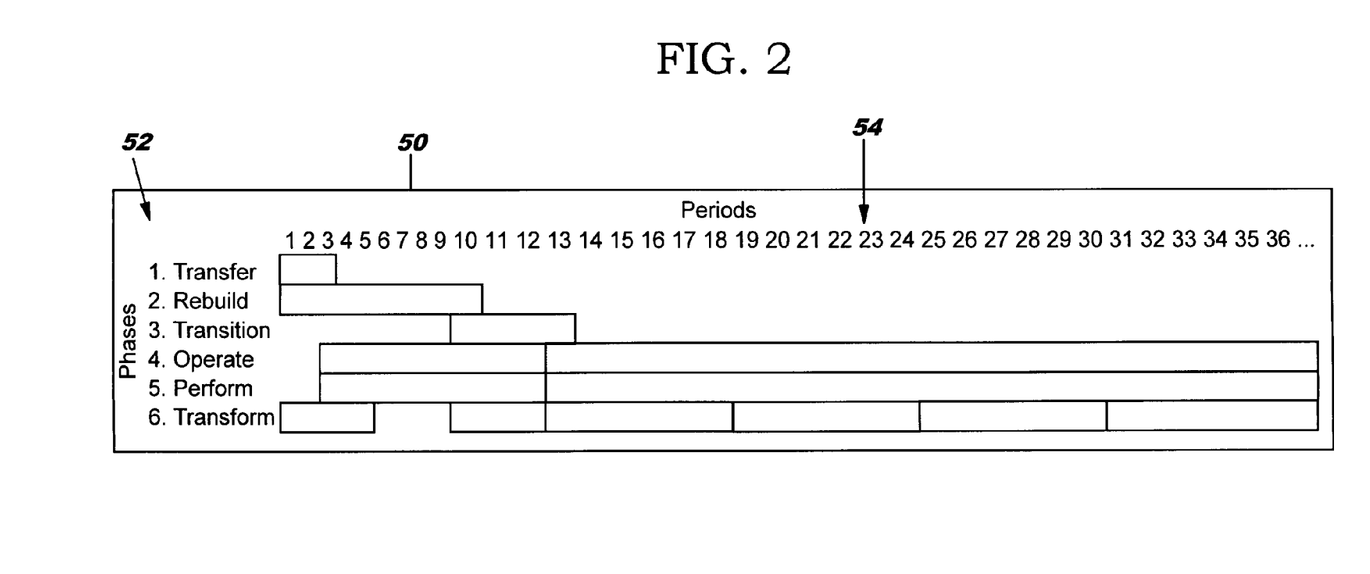
FIG. 2 depicts an illustrative high-level plan for a Business Transformation Outsourcing (BTO) project.

When it is initially desired to outsource a business function from client 42 to outsourcer 44, a plan for the project must first be developed. As such, planner 14 will interface with planning system 34. In general, an outsourcing project, as planned, will include a plurality of overlapping phases extending over a plurality of time periods. Referring to FIG. 2, an illustrative plan 50 is shown in greater detail. As can be seen, plan 50 includes phases 52 that extend over time periods 54. In a typical embodiment, the phases 52 comprise the following:

(1) A transfer phase during which the outsourcer 44 may acquire some of the client 42's assets and staff in preparation for transfer of responsibility for the client 42's current business processes. The resulting business benefits often come from the outsourcer 44's ability to perform essentially the same processes at a lower price, usually through some form of labor arbitrage, and perhaps at higher quality. If the outsourcer 44 acquires some of the client 42's assets, and it is not entirely a cash transaction, those business benefits occur later.

(2) A rebuilding phase during which the outsourcer 44 builds and implements the necessary information technology (IT) infrastructure with the client 42's input as needed. If the new IT infrastructure must be customized to serve a transformed business process, some or all of that business process transformation may be performed before or concurrent with this phase. This amounts to accelerating portions of phase #6. (See below) Otherwise, there may be no direct business benefits associated with phase #2 unless obsolete elements of the old IT infrastructure can be retired. Nevertheless, the costs of this phase can be substantial if the client 42's existing IT infrastructure is old or inappropriate for current business needs. This can create an investment requirement if the benefits of the transformed business process are not flowing concurrent with this phase.

(3) A transitional phase during which the outsourcer 44 and client 42 execute the transition from the current business processes to the new business processes, staffing model, and supporting IT infrastructure. The business benefits from this phase may include compliance with legal and regulatory requirements as well as lower process costs. However, the costs may include (a) operating some portions of both the old and new IT infrastructure concurrently and (b) performing some portion of both the old and new processes concurrently, thereby incurring higher overall operating and processing costs than in any other phase. On the other hand, modernization and automation may dramatically reduce some infrastructure and process costs as more work is shifted to the new infrastructure and processes.

(4) An operational phase that is on-going, the outsourcer 44 operates the IT infrastructure which supports the business processes. As phases #2 and #3 are completed, the amount of old IT infrastructure declines and new IT rises (5) A performance phase that is also on-going, the outsourcer 44 performs first the old, then the new business processes. Continuous process improvement is often an integral part of this phase. Such improvements create additional process efficiencies (e.g., eliminating an unnecessary paper form) or process benefits (e.g., finding additional tax deductions) without necessarily transforming the business (6) A transformation phase that may be on-going or intermittent, the outsourcer 44 collaborates with the client 42 on the business transformations enabled by the new business processes and any subsequent improvements to them. Such business transformations may include, but are not limited to, (a) cost savings from non-process sources, such as procuring goods/services at lower prices or better terms via strategic sourcing contracts, (b) additional revenue from existing markets, such as using Customer Relationship Management (CRM) Systems to sell additional products/services to current customers, and (c) new revenue from entry into new markets, such as offering goods/services in countries covered by the outsourcer 44 but not previously covered by the client 42.

Referring back to FIG. 1, once the phases and time periods have been planned, planner 14 will utilize cost calculation system 36 to estimate a cost for the outsourcing project. Specifically, as indicated above, outsourcing a business process typically involves certain start-up or investment costs. This may come in the form of IT, man-power, etc. Therefore, in a typical embodiment, planner 14 can input estimated costs for each of the phases. Such costs could be based on a certain time period. For example, planner 14 could input values that would result in the transfer phase costing approximately $10,000 per month. In such a case, cost calculation system 36 would estimate the total cost for the transfer phase based on the planned time period (e.g., $30,000 for three months). Similar steps could then be taken to estimate individual phase costs for the other phases, and then a total cost could be estimated by summing these individual phase costs. It should be understood, however, that cost calculation system 36 could actually operate in any fashion. For example, planner 14 could input an estimated cost for each phase (total or based on a fixed time period as discussed above), planner 14 could input costs for individual tasks/events that will occur as part of the project for which cost calculation system 36 could maintain a total, etc. In any event, the end result is to estimate a cost for the outsourcing project as planned.

Once the cost for the project has been estimated, cost calculation system 36 can be used to estimate any excess of the cost beyond the client's planned budget 42. For example, it is commonly the case that the costs involved with outsourcing the business process could cost the client 42 more (at least in terms of initial or incremental investments) than it would to currently perform the business function internally.

Figure 3:
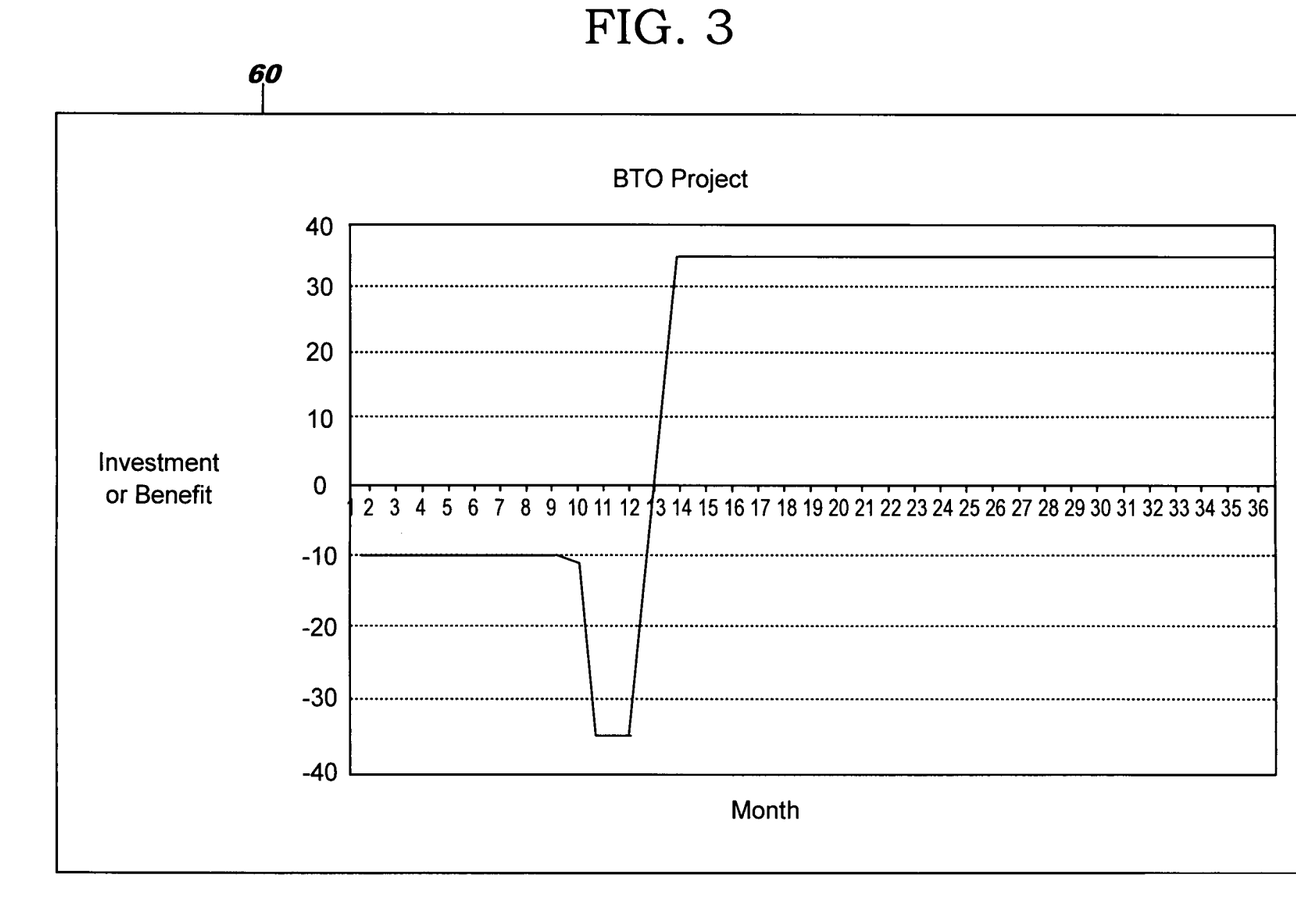
FIG. 3 depicts an illustrative graph of client investment versus time for a BTO project without funding.

Referring to FIG. 3, an illustrative graph 60 depicting the investment or benefit (in tens of thousands of dollars) versus time (in months) for a hypothetical BTO project is shown. As can be seen, for over a year, the outsourcing project will cost the client 42 substantial funds (e.g., with a peak investment level of about $34,000). This "investment" is considered to be an "excess" above/beyond the client's planned budget 42. It is only after the thirteenth month that the client 42 starts to realize the benefits of outsourcing the business process. Graph 50 is typical of results that are produced without the present invention. Months 1-10 represent the client 42's investment during phases #1 and #2, "Transfer" and "Rebuilding." Months 11-12 represent additional investment during phase #3, "Transitional," when portions of both the old and new processes may be performed concurrently. Months thereafter represent benefits during phases #4 and #5, "Operational" and "Performance." (In this phase #6, "Transformation is not shown.")

Under the present invention, the excess cost/investment period will be addressed while an agreement for the outsourcing project between the client 42 and the outsourcer 44 is being reached. Specifically, this invention enables clients to obtain the benefits of BPO or BTO while reducing or eliminating the need for incremental investment above each client 42's planned budget. In addressing funding while BPO/BTO deals are being formed, (a) the outsourcing project plan can be restructured (e.g., the plurality of time periods in the project plan can be restructured to reduce or eliminate the excess), (b) financing can be integrated into the agreement, or assistance can be given to the client 42 in obtaining favorable financing terms from third parties, (c) a self-funding project can be created from the client 42's perspective, or any combination thereof.

In one embodiment, planner 14 can reduce or eliminate the excess cost by utilizing planning system 34 (FIG. 1) to restructure the plan. Restructuring can take many forms. Examples include: (1) restructuring the plurality of overlapping phases and/or time periods (described in further detail below); (2) reducing the scope (e.g., outsourcer 44 will take over business processes A through K, while client 42 retains Y and Z); (3) changing methods (e.g., outsourcer 44 will divert X % more calls to self-service via Integrated Voice Response (IVR) or web); (4) changing completion criteria (e.g., customer records older than X years will not be converted); (5) changing target performance levels (e.g., percent of calls answered within 20 seconds will be X % instead of Y %); (6) changing responsibility (e.g., client will perform tasks 1, 2, 3 while outsourcer or one of its subcontractors perform tasks 4, 5, 6). These examples can be used alone or in combination with one another and/or in combination with one or more of the funding options discussed below.

As indicated above, one way to restructure the outsourcing project plan is to restructure the plurality of overlapping phases and/or time periods. In one alternative, planner 14 can change (e.g., shorten or move) the phases in which investments are required so that such phases don't overlap or overlap for a shorter period of time. For example, planner 14 could shorten the transfer phase to two months and/or commence the rebuilding phase later (e.g., at month two). Moreover, planner 14 could adjust the phases so that the latter phases where benefits are realized overlap more with the phases that require investments. This could help reduce or eliminate (e.g., wash out) any excess cost.

In lieu of, or in combination with restructuring the outsourcing project plan, planner 14 could utilize funding system 38 (FIG. 1) to be provided with a set of funding options to cover/address the excess cost. Such funding options can include funding integrated with the agreement, or even the creation of a self-funding project from the client 42's perspective. Listed below are illustrative funding options under the present invention:

(1) The outsourcer 44 may acquire some or all of the client 42's assets related to the business processes being outsourced, such as information technology including computer and communications hardware, software, and networks. The assets acquired by the outsourcer may also include physical facilities, such as delivery and service centers. Still yet, the assets may include a wide variety of intellectual capital, such as best practices, methodologies, training material and approaches, patents, trademarks, reference documentation, estimating techniques, forecasting models, optimization models, simulation models, contact databases, issues databases, and benchmark databases. Asset acquisition transfers some of the financial burden from the client 42 to the outsourcer 44. Moreover, to the degree that the outsourcer 44 can leverage those assets across multiple clients, the value of those assets may be higher. Alternatively, if the outsourcer 44 already has assets comparable or superior to the client 42's, some of the client 42's existing costs can simply be eliminated (e.g., by dropping the lease and maintenance fees on software that is no longer needed).

(2) The outsourcer 44 can work with the client 42 and its third-party lender or internal funding source to obtain favorable terms on a loan or budget. In this case, the outsourcer 44's reputation and detailed business case may lend more credibility to the transaction than if the client 42 acted alone. This is particularly true if the outsourcer 44 is able to establish a compelling vision of the strategic benefits of BTO rather than the tactical benefits of BPO. The justification may also be strengthened by business process and outsourcing simulations and/or optimization models that the outsourcer 44 brings. By exploring various decision alternatives and business scenarios, the risks inherent in outsourcing can be quantified and mitigated, which generally improves financing terms. To the degree that the outsourcer has performed multiple outsourcing engagements previously, its simulation and optimization models are likely to be more robust—and therefore have more credibility with financing decision makers—than basic spreadsheet models developed by a client based on its own experience or a limited number of its peers.

(3) The outsourcer 44 can provide financing itself or through its financing division, perhaps by building repayment of the loan into the client 42's payments during later phases. In this case, the loan is the client 42's obligation, but the outsourcer 44 has incentive to see the client 42 receive favorable terms because this enables the rest of the project.

(4) The outsourcer 44 may create a fully or partially "self-funding" project when viewed from the client 42's perspective. The outsourcer 44 may do this by reducing its profit margins during early periods in exchange for higher margins during later periods. Most outsourcers will, however, expect the higher margin in later periods to cover not only their own cost of capital, but also a premium for the risk the outsourcer 44 is accepting. Nevertheless, from the client 42's perspective, the fee increases coincide with benefit increases, which is a favorable correlation.

(5) Another way the outsourcer 44 may create a "self-funding" project is to "tap" the spread between the client 42's pre-outsourcing cost and the outsourcer 44's price. Specifically, to the degree that the outsourcer 44 can perform the existing processes at a lower price than the client 42's pre-outsourcing cost, if the client 42 continues to pay the outsourcer 44 an amount equal to its pre-outsourcing cost, the difference between the new price and the old cost can be used to cover some portion of later phases. One way the outsourcer 44 may lower its price is to consolidate and standardize disparate business processes and policies. A second way is to employ low-cost global centers rather than the high-cost local, regional, or national centers the client 42 is currently using. A third way is to automate portions of the processes that were previously labor intensive. A fourth way is to employ workers whose productivity and quality rates are higher (i.e., what typically was a back-office job at the client 42 becomes a front-office job at the outsourcer 44, with additional tools, compensation, education, and career opportunities).

(6) Yet another way the outsourcer 44 can create a "self-funding" project is to base some portion of its fees on the amount of savings generated by outsourcing. In effect, the outsourcer 44 is paid out of the client 42's benefits, but the outsourcer 44 assumes some risk that such benefits will not occur. If they do not occur as anticipated, the outsourcer 44 experiences reduced profit, or even a loss. On the other hand, if benefits exceed expectations, the outsourcer 44 shares in those increased benefits. The outsourcer 44 therefore accepts additional risk in exchange for a larger share of the rewards. From the client 42's perspective, this has the additional advantage of aligning the outsourcer 44's goals with the client 42's long-term objectives. The drivers and specific formulas for quantifying savings and the portion to be paid the outsourcer can take many forms. For example, a different minimum dollar savings target can be specified for each year of the contract, with the outsourcer 44's portion being a fixed proportion of savings exceeding those targets. Alternatively, a constant minimum percent savings target can be specified for all years of the contract, with the outsourcer 44's portion being a variable proportion of savings exceeding that target. In the latter case, the outsourcer 44's portion may be tied to a sliding scale that increases its portion as savings rise.

(7) The outsourcer 44 and client 42 can accomplish any of a wide variety of business transformations beyond just cost takeout. For instance, the outsourcer 44 may offer new recruiting approaches in human resources, new tax saving methods in accounting, or new buying strategies in procurement. If the outsourcer 44's fees are governed by a risk-reward sharing agreement, as in funding option #6 above, it is in outsourcer 44's interest to go beyond just cost takeout. Furthermore, the outsourcer 44 may also find ways to accelerate the benefits since such acceleration is a way to reduce financing needs by reducing the time between investment and repayment. The drivers and specific formulas for quantifying benefits and amounts to be paid the outsourcer 44 can take many forms. For example, improving a key measurable aspect of the business process from its pre-outsourcing value below the industry median to a post-outsourcing value at or above the industry benchmark (e.g., $80^{th}$ percentile) could result in a specified payment to the outsourcer 44. Those measurable aspects could include customer satisfaction with outsourced contact centers, number of strategically sourced commodities in outsourced procurement centers, on-time and error-free transactions in outsourced accounting centers, and employee satisfaction with outsourced HR service centers. Furthermore, the formulas can be written so that the earlier such benefits commence, the greater the amount paid to the outsourcer 44 because the client 42 receives its benefits sooner and longer.

(8) The outsourcer 44 can offer the client 42 "on-demand" business processes. From the client 42's perspective, on demand means that what had been relatively fixed costs for business processes before outsourcing become relatively variable prices after outsourcing. This "variablization" of pricing has several beneficial consequences. First, the client 42 can expect the peaks and valleys in business processes generated by business cycles, seasons, and one-time events will be handled by the outsourcer 44, subject to service level agreements, and transaction-based charges will increase or decrease with volumes accordingly. Second, the client 42 itself no longer must budget and plan capacity for peak processing loads, which creates excess capacity during non-peak periods. Instead, by aggregating demand from many clients, across industries and geographies, the outsourcer 44 experiences smaller overall variance in demand, despite the ups and downs associated with any one client, industry, or geography. Finally, the client 42 no longer carries the entire burden of technology obsolescence. The outsourcer 44 typically incorporates routine technology refreshes into its plans and prices because obsolete technology is not as amenable to on demand processes.

It should be noted that none of these alternatives are necessarily mutually exclusive. The most leverage generally comes from creative combinations of options. Regardless, funding options such as these can be presented by funding system 38. Moreover, funding system 38 could rank the funding options according to what would best fit the particular situation. For example, planner 14 could input certain cost, resource and/or time constraints of the client 42 as well as general credit information (e.g., a credit rating). Based on the overall position of the client 42, funding system 38 could present one or more of the above funding options in a preferred order.

In any event, should planner 14 select one or more of the above funding options to cover the excess costs, the funding option will typically be integrated into or at least detailed in the outsourcing agreement between the client 42 and outsourcer 44. Moreover, whether planner 14 chose to restructure the plurality of overlapping phases/time periods, select one or more of the funding options, or some combination thereof, any excess costs are addressed while the agreement is being reached (i.e., not after) under the present invention. In any event, the finalized plan as well as details of any funding options chosen can be presented to planner 14 via presentation system 40 (FIG. 1).

Figure 4:
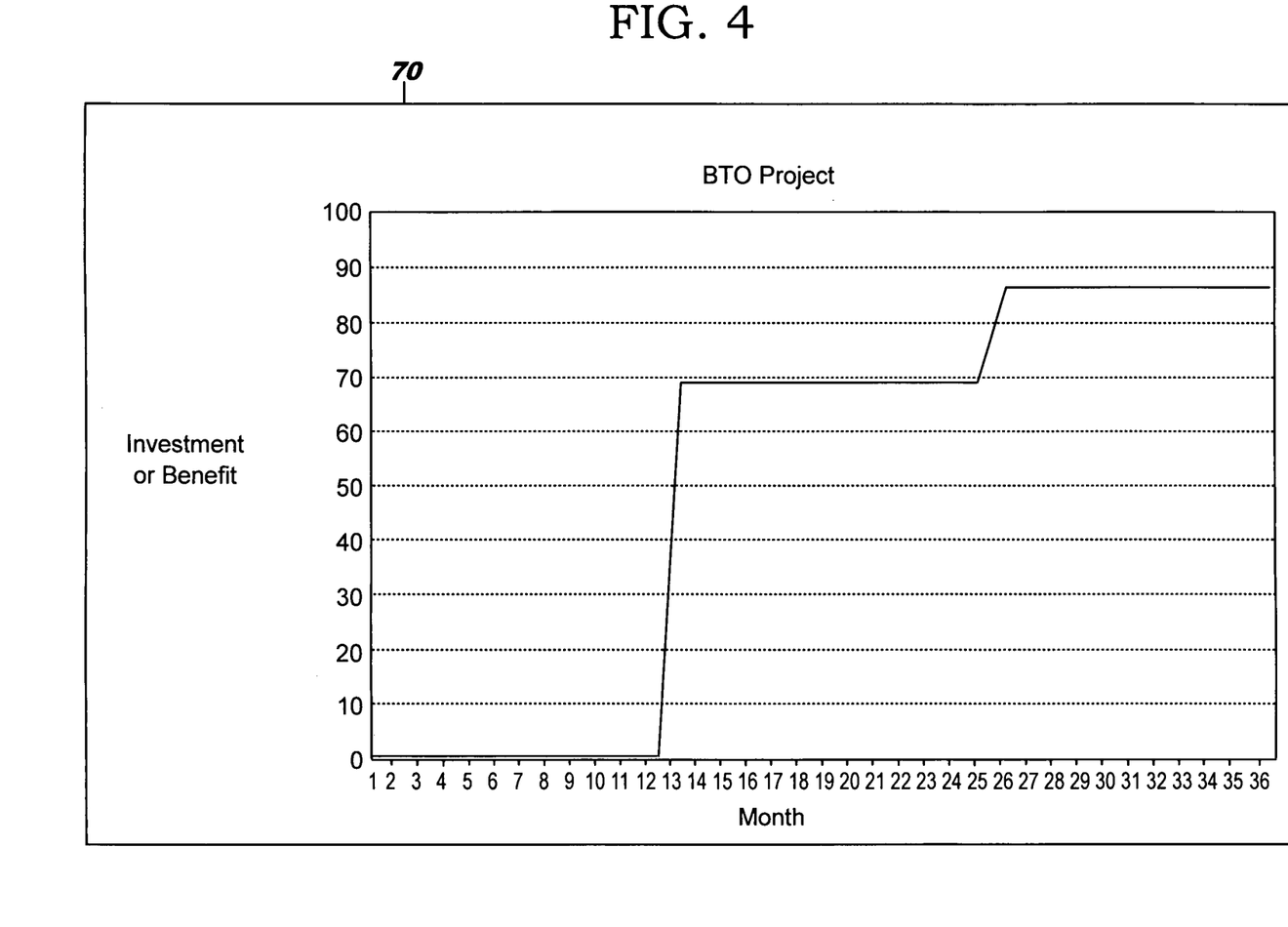
FIG. 4 depicts an illustrative graph of client investment versus time for a BTO project with funding according to the present invention.

Referring now to FIG. 4, an illustrative graph 70 depicting investment or benefit (in tens of thousands of dollars) versus time (in months) for a BTO project that in which excess costs were addressed under the present invention. For example, in viewing FIG. 4, assume that one or more of the above funding options and/or a restructure of the phases were implemented. As can be seen from FIG. 4, the BTO project required out-of-pocket investment by the client 42, rather, the period during which a loss was observed in FIG. 3 (e.g., months 1-12), is now a break even period under the present invention. In FIG. 4, months 1-12 represent substantially less net investment by the client 42 during phases #1 through #3, "Transfer," "Rebuilding," and Transitional." The months thereafter represent benefits during phases #4 through #6, "Operational," "Performance," and "Transformation."

Figure 5:
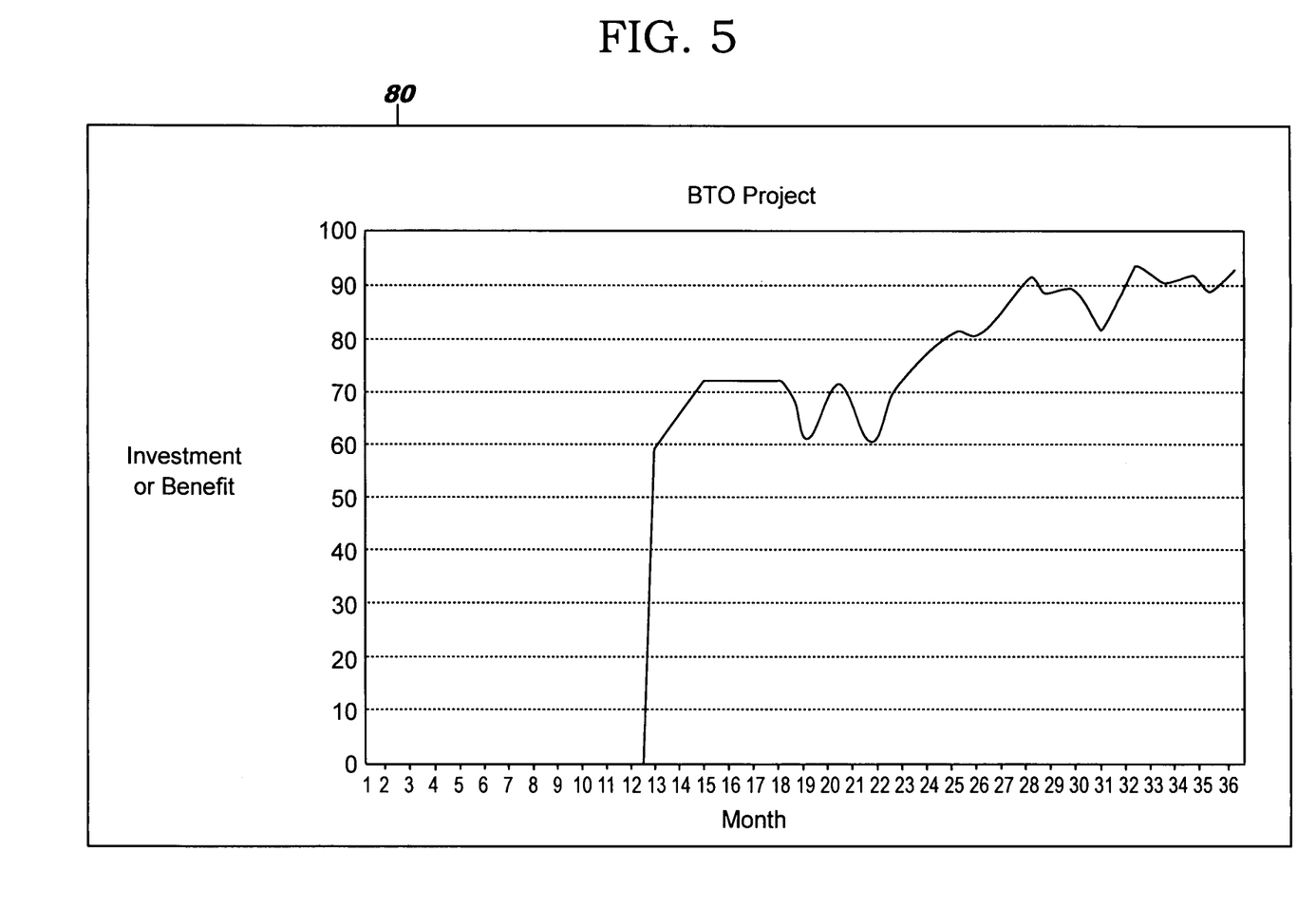
FIG. 5 depicts an illustrative graph of client investment versus time for a BTO project provided on-demand according to the present invention.

Referring now to FIG. 5, an illustrative graph 80 depicting investment or benefit (in tens of thousands of dollars) versus time (in months) for a BTO project in which excess costs were covered using funding option #8 above, on-demand. Although the benefit period after breakeven (e.g., after month 12) is graphically distinct than the same period in FIG. 4, it can nevertheless be seen that offering the BTO on-demand similarly prevents a loss period from occurring. The variations in benefits after month 12 correspond to ups and downs in the client 42's business, which means that outsourcing fees rise when the client 42's business is up, but more importantly, fall when its business is down.

As can thus be seen, the present invention provides many advantages. Specifically, advantages of this invention for clients are (a) it makes outsourcing more affordable, (b) it aligns the outsourcer's interests with the client's interests, and (c) it can make outsourcing feasible when other funding alternatives are unavailable. Advantages of this invention for the outsourcer are (a) it makes BTO attractive to, and affordable by, a wider set of potential clients, (b) it makes the strategic benefits of BTO affordable in circumstances where only the tactical benefits of BPO would otherwise be feasible, and (c) the risk-reward opportunities opened by creative financing increase the outsourcer's earning potential.

It should be appreciated that the present invention could be offered as a business method on a subscription or fee basis. For example, computer system 12 and/or project system 32 of FIG. 1 could be created, supported, maintained and/or deployed by a service provider that offers the functions described herein for customers. That is, a service provider could offer to plan and manage a contact center study as described above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of project system 32 of FIG. 1 is intended to be illustrative only. Moreover, the depiction of plan 50 is intended to be illustrative as well.

We claim:

1. A computer implemented method for funding an outsourcing project corresponding to one or more business processes to be outsourced from a client to a chosen outsourcer, comprising:
    planning, with a computer device, the outsourcing project, wherein the outsourcing project is planned to have a plurality of overlapping phases extending over a plurality of time periods;
    estimating, with the computer device, a cost to the client for implementing the outsourcing project, wherein the cost has a plurality of levels depending on a stage in the plurality of overlapping phases;
    in response to a determination, by the computer device, that the cost estimated for overlapping phases during a particular time period will exceed a planned budget for the particular time period in the plurality of time periods, restructuring at least one of the plurality of overlapping phases prior to a start of the outsourcing project to prevent the cost from exceeding the planned budget of the client during the particular time period; and presenting the outsourcing project after the restructuring.

2. The method of claim 1, wherein the outsourcing project is a Business Transformation Outsourcing (BTO) project.

3. The method of claim 1, wherein the outsourcing project is a Business Process Outsourcing (BPO) project.

4. The method of claim 1, wherein the planned budget of the client is based on a cost involved with implementing the business process at the client and anticipated benefits of the outsourcing project.

5. The method of claim 1, wherein the plurality of phases comprise a transfer phase, a rebuilding phase, a transitional phase, an operational phase, a performance phase and a transformation phase.

6. The method of claim 1, further comprising implementing the outsourcing project after the presenting step.

7. The method of claim 1, further comprising addressing funding to cover any excess of the cost beyond the planned budget of the client while an agreement between the client and the outsourcer for the outsourcing project is being reached.

8. The method of claim 7, wherein the addressing step comprises integrating funding into the agreement.

9. The method of claim 7, wherein the addressing step comprises making the outsourcing project self-funding from a perspective of the client.

10. A computer implemented method for funding an outsourcing project corresponding to one or more business processes to be outsourced from a client to a chosen outsourcer, comprising:

planning, with a computer device, the outsourcing project;

estimating, with the computer device, a cost for implementing the outsourcing project as planned, and an excess of the cost above a planned budget of the client for every stage in the plurality of overlapping phases, wherein the cost has a plurality of levels depending on the stage in the plurality of overlapping phases and the excess of the cost is a determination that the cost estimated for overlapping phases during a particular time period will exceed a planned budget for a particular time period; and addressing funding for at least one of the plurality of overlapping phases to cover the excess while an agreement for the outsourcing project is being reached between the outsourcer and the client.

11. The method of claim 10, wherein the addressing step comprises the outsourcer acquiring at least some assets of the client related to the business process.

12. The method of claim 10, wherein the addressing step comprises the outsourcer collaborating with a funding source on behalf of the client.

13. The method of claim 10, wherein the addressing step comprises the outsourcer providing the funding to the client.

14. The method of claim 10, wherein the addressing step comprises the outsourcer reducing profit margins during early stages of the outsourcing project.

15. The method of claim 10, wherein the addressing step comprises the outsourcer performing the business process at a lower cost than the current level, and the outsourcer collecting the current level from the client.

16. The method of claim 10, wherein the addressing step comprises basing the cost on a portion of savings for the client when the business process is outsourced to the outsourcer.

17. The method of claim 10, wherein the addressing step comprises the outsourcer providing the client with business transformations associated with the business process to reduce the cost or increase benefits.

18. The method of claim 10, wherein the addressing step comprises the outsourcer providing the client with the business process on-demand.

* * * * *